US010418769B2

(12) United States Patent
Nakano et al.

(10) Patent No.: US 10,418,769 B2
(45) Date of Patent: Sep. 17, 2019

(54) COMMUTATOR, ELECTRIC MOTOR, AND METHOD FOR MANUFACTURING COMMUTATOR

(71) Applicant: Panasonic Intellectual Property Management Co., Ltd., Osaka (JP)

(72) Inventors: Keisaku Nakano, Osaka (JP); Kenji Kondo, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 326 days.

(21) Appl. No.: 15/533,606

(22) PCT Filed: Feb. 2, 2016

(86) PCT No.: PCT/JP2016/000514
§ 371 (c)(1),
(2) Date: Jun. 6, 2017

(87) PCT Pub. No.: WO2016/129239
PCT Pub. Date: Aug. 18, 2016

(65) Prior Publication Data
US 2018/0145471 A1 May 24, 2018

(30) Foreign Application Priority Data

Feb. 12, 2015 (JP) .................. 2015-024896

(51) Int. Cl.
*H01R 39/04* (2006.01)
*H02K 13/00* (2006.01)
(Continued)

(52) U.S. Cl.
CPC ............. *H01R 39/04* (2013.01); *H01R 39/46* (2013.01); *H01R 43/06* (2013.01); *H02K 13/00* (2013.01); *H02K 13/006* (2013.01)

(58) Field of Classification Search
CPC ........ H01R 39/04; H01R 43/06; H01R 39/46; H01R 39/022; H01R 39/14; H01R 39/16; H02K 13/00; H02K 13/006
(Continued)

(56) References Cited

U.S. PATENT DOCUMENTS 5,124,609 A * 6/1992 Nagasaka ............... H01R 43/08
310/233
5,208,502 A * 5/1993 Yamashita ........... H01R 39/022
310/219

(Continued)

FOREIGN PATENT DOCUMENTS

| JP | 4-109847 A | 4/1992 |
| JP | 2006-197754 | 7/2006 |
| JP | 2012086529 A * | 5/2012 |

OTHER PUBLICATIONS

Machine Translation of JP2012086529A (Year: 2012).*
(Continued)

*Primary Examiner* — Bernard Rojas
(74) *Attorney, Agent, or Firm* — McDermott Will & Emery LLP

(57) ABSTRACT

Commutator of the present invention includes electrically conductive part, resin part, ceramic part, first mixing part and second mixing part. First mixing part contains an electrically conductive material and a ceramic material in mixture. In first mixing part, a content of the electrically conductive material decreases and a content of the ceramic material increases from electrically conductive part toward ceramic part. Second mixing part contains the ceramic material and the resin material in mixture. In second mixing part, a content of the ceramic material decreases and a content of the resin material increases from ceramic part toward resin part.

12 Claims, 10 Drawing Sheets

(51) Int. Cl.
*H01R 43/06* (2006.01)
*H01R 39/46* (2006.01)

(58) Field of Classification Search
USPC .................................................. 310/235–236
See application file for complete search history.

(56) References Cited

U.S. PATENT DOCUMENTS

| | | | |
|---|---|---|---|
| 2006/0255678 A1* | 11/2006 | Du | H01R 43/10 310/156.43 |
| 2009/0126184 A1* | 5/2009 | Smith | H02K 3/44 29/597 |
| 2017/0126087 A1* | 5/2017 | Soderberg | H02K 21/042 |

OTHER PUBLICATIONS

Front page of Chinese Office Action dated Jan. 2, 2019 for the related Chinese Patent Application No. 201680005518.1. and English Translation of Search Report thereof.
International Search Report of PCT application No. PCT/JP2016/000514 dated May 10, 2016.

* cited by examiner

US 10,418,769 B2

COMMUTATOR, ELECTRIC MOTOR, AND METHOD FOR MANUFACTURING COMMUTATOR

This application is a U.S. national stage application of the PCT international application PCT/JP2016/000514 filed on Feb. 2, 2016, which claims the benefit of foreign priority of Japanese patent application No. 2015-024896 filed on Feb. 12, 2015, the contents all of which are incorporated herein by reference.

TECHNICAL FIELD

The present invention relates to a commutator for use in an electric motor to be attached to a household electric appliance, a vehicle or the like, an electric motor including the commutator, and a method for manufacturing a commutator.

BACKGROUND ART

In an electric motor including a commutator, a driving current is supplied through a brush to a rotor including the commutator. Hereinafter, an electric motor including a commutator is also referred to simply as an electric motor.

The electric motor has a contact point at which a brush and a commutator are in mechanical contact with each other. The commutator includes a plurality of commutator pieces. The electric motor uses the brush and the commutator to commutate a driving current that is supplied to a rotor. At the mechanical contact point, spark discharge occurs between the brush and the commutator in commutation of the driving current.

Methods for eliminating the spark discharge have been heretofore proposed. Patent Literature 1 describes a method using a variable resistor (hereinafter, referred to as a "varistor") as and a method using a multilayer chip capacitor (hereinafter, referred to as a "capacitor") as an element that absorbs a surge.

FIG. 7A is a plan view of a varistor to be attached to a conventional commutator. FIG. 7B is a sectional view showing a cross-section taken along line 7B-7B shown in FIG. 7A.

FIGS. 8A to 8D are main part conceptual views showing a mounting state of a conventional commutator.

FIG. 9A is a plan view showing a mounting state of a capacitor to be attached to a conventional commutator. FIG. 9B is a side view showing a mounting state of a capacitor to be attached to a conventional commutator.

FIGS. 10A to 10D are main part conceptual views showing a mounting state of a conventional commutator.

As shown in FIGS. 7A and 7B, varistor 20 has a ring shape as an outer shape. As shown in FIGS. 8A to 8D, varistor 20 is connected directly to commutator 1001 by solder 23.

As shown in FIGS. 9A and 9B, capacitor 21 is electrically connected to wiring plate 22 by solder 23. As shown in FIGS. 10A to 10D, wiring plate 22, to which capacitor 21 is attached, is connected to commutator 1001 by solder 23.

In other words, capacitor 21 is connected indirectly to commutator 1 through wiring plate 22. Capacitor 21 is electrically connected at such a position that a pair of adjacent commutator pieces are connected to each other.

CITATION LIST

Patent Literature

PTL 1: Unexamined Japanese Patent Publication No. 2006-197754

SUMMARY

A commutator according to the present invention is formed in a cylindrical shape along an axial center, and includes an electrically conductive part, a resin part, a ceramic part, a first mixing part and a second mixing part.

The electrically conductive part is situated on an outer periphery side of the commutator in a direction orthogonal to the axial center. The electrically conductive part contains an electrically conductive material. In the electrically conductive part, a plurality of commutator pieces are formed to extend from an outer periphery surface of the commutator toward an opposite side of the axial center.

The resin part is situated on an inner periphery side of the commutator in a direction orthogonal to the axial center. The resin part contains a resin material.

The ceramic part is situated between the electrically conductive part and the resin part in a direction orthogonal to the axial center. The ceramic part contains a ceramic material.

The first mixing part is situated between the electrically conductive part and the ceramic part in a direction orthogonal to the axial center. The first mixing part contains the electrically conductive material and the ceramic material in mixture. In the first mixing part, a content of the electrically conductive material decreases and a content of the ceramic material increases from the electrically conductive part toward the ceramic part.

The second mixing part is situated between the ceramic part and the resin part in a direction orthogonal to the axial center. The second mixing part contains the ceramic material and the resin material in mixture. In the second mixing part, a content of the ceramic material decreases and a content of the resin material increases from the ceramic part toward the resin part.

DESCRIPTION OF PREFFERED EMBODIMENTS

Figure 1:
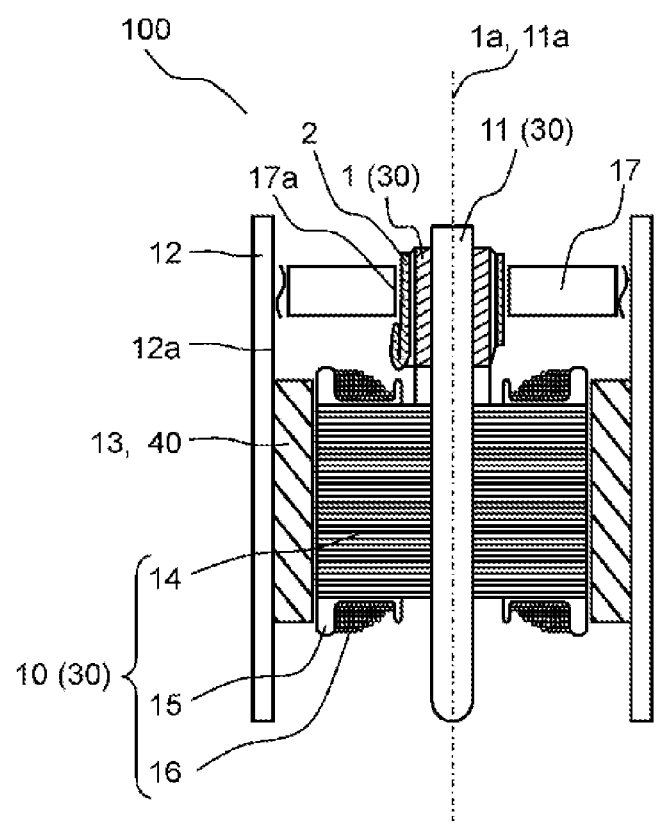
FIG. 1 is a sectional view showing an outline of an electric motor in a first exemplary embodiment of the present invention.

A commutator in an exemplary embodiment of the present invention has a configuration as described later, where a composition of the commutator changes continuously or stepwise from an electrically conductive part situated on an outer periphery side toward a resin part situated on an inner periphery side, in a direction orthogonal to an axial center.

In other words, the commutator in the exemplary embodiment has no boundary surface between the electrically conductive part and a first mixing part, between the first mixing part and a ceramic part, between the ceramic part and a second mixing part, and between the second mixing part and the resin part. The commutator in the exemplary embodiment has no microscopic voids which are supposed to be generated at a boundary surface if the boundary surface is generated.

Accordingly, in the commutator in the exemplary embodiment, properties such as a thermal expansion coefficient change continuously or stepwise from the outer periphery side toward the inner periphery side in a direction orthogonal to the axial center.

Accordingly, the commutator formed of a plurality of materials can be handled as a single body.

The commutator in the exemplary embodiment allows thermal stress to be smoothly distributed in the commutator.

As a result, a rotor is rotated at a high speed, and thus even if a centrifugal force acts on the commutator, defects such as delamination and cracking do not occur in commutator pieces. Accordingly, the commutator has improved reliability.

Particularly, in the commutator in the exemplary embodiment of the present invention, below-described electric properties of a pair of adjacent commutator pieces can be adjusted within a desired range when a groove part as described later is formed in the electrically conductive part.

One of the electric properties is a value of a capacitance of a pair of adjacent commutator pieces. The other one of the electric properties is a value of a varistor voltage of a pair of adjacent commutator pieces.

In the commutator in the exemplary embodiment, electric properties of a pair of adjacent commutator pieces can be adjusted according to a purpose of using an electric motor.

Conventional commutators have below-described points to be improved.

When an electric motor is in a stopped state, a commutator, a brush and so on have a temperature equal to an atmospheric temperature under an environment in which the electric motor is attached. When the electric motor is driven, a temperature of a surrounding of a surface at which a commutator and a brush rub against each other may be 200° C. or higher.

Thus, in a commutator, a brush and so on, a temperature change repeatedly occurs. Members such as a commutator and a brush have different thermal expansion coefficients due to a difference in material. Accordingly, the commutator, the brush and so on have thermal stress resulting from the temperature change that repeatedly occurs.

As a result, cracks may be generated in a soldered part at which the commutator and a capacitor are directly connected to each other, or in a soldered part at which the commutator and a varistor are indirectly connected to each other. The capacitor and the varistor that are connected to the commutator may be cracked at a main body, or delaminated at an electrode part.

A structure of the conventional commutator requires a manufacturing technique with a high degree of difficulty because a manufacturing process is complicated.

Cracks in a soldered part, cracking in a capacitor main body and a varistor main body or delamination at an electrode part as described above may occur in the manufacturing process.

Accordingly, the structure of the conventional commutator requires a large number of man-hours for securing quality.

The later-described commutator of the exemplary embodiment of the present invention can be manufactured by a simple manufacturing process while having improved resistance to a temperature change that repeatedly occurs.

The commutator of the exemplary embodiment can be expected to have a long life because properties of the commutator change continuously or stepwise.

When a groove part as described later is formed in the electrically conductive part, a desired capacitance and a desired varistor voltage are secured in a pair of adjacent commutator pieces.

Accordingly, in the commutator of the exemplary embodiment, spark discharge occurring when a commutator and a brush rub against each other can be reduced. As a result, in the commutator of the exemplary embodiment, electric noises resulting from spark discharge can be suppressed.

Hereinafter, exemplary embodiments of the present invention will be described with reference to drawings. The following exemplary embodiments provide an example of embodying the present invention, and do not limit a technical scope of the present invention.

(First Exemplary Embodiment)

Figure 2A:
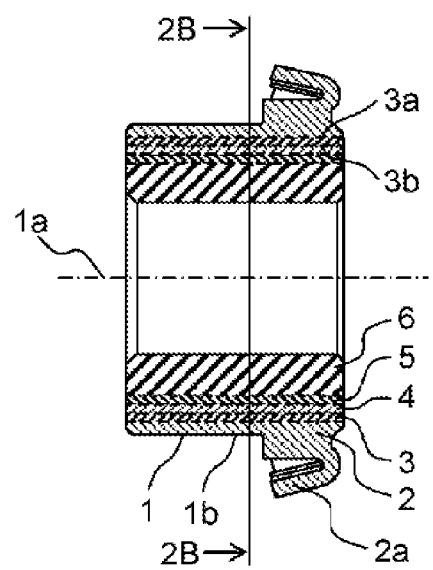
FIG. 2A is a sectional view showing an outline of a commutator in the first exemplary embodiment of the present invention.

FIG. 1 is a sectional view showing an outline of an electric motor in a first exemplary embodiment of the present invention. FIG. 2A is a sectional view showing an outline of a commutator in the first exemplary embodiment of the present invention.

Figure 2B:
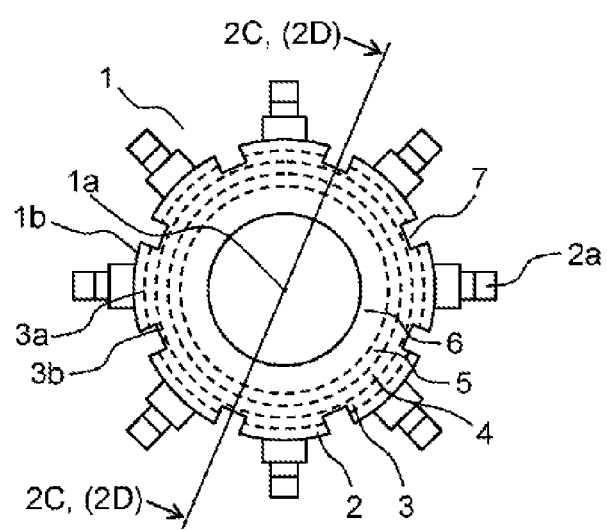
FIG. 2B is a front view of the commutator in the first exemplary embodiment of the present invention.

FIG. 2B is a front view of the commutator in the first exemplary embodiment of the present invention.

Figure 2C:
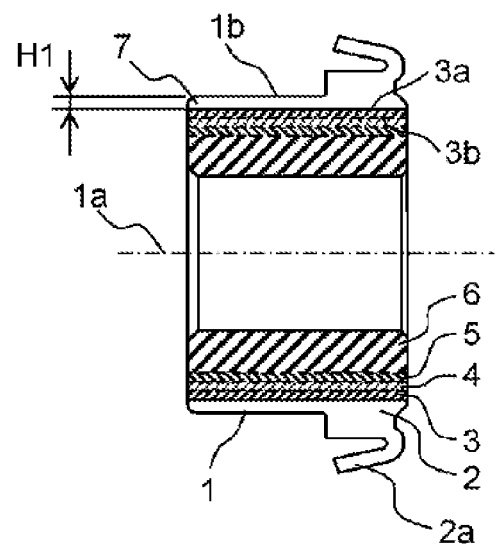
FIG. 2C is a sectional view showing a cross-section taken along line 2C-2C shown in FIG. 2B.
Figure 2D:
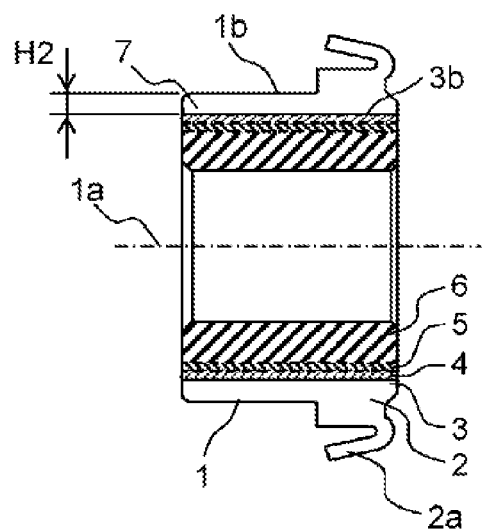
FIG. 2D is a sectional view showing a cross-section taken along line 2D-2D shown in FIG. 2B.

FIG. 2C is a sectional view showing a cross-section taken along line 2C-2C shown in FIG. 2B. FIG. 2D is a sectional view showing a cross-section taken along line 2D-2D shown in FIG. 2B.

Figure 3:
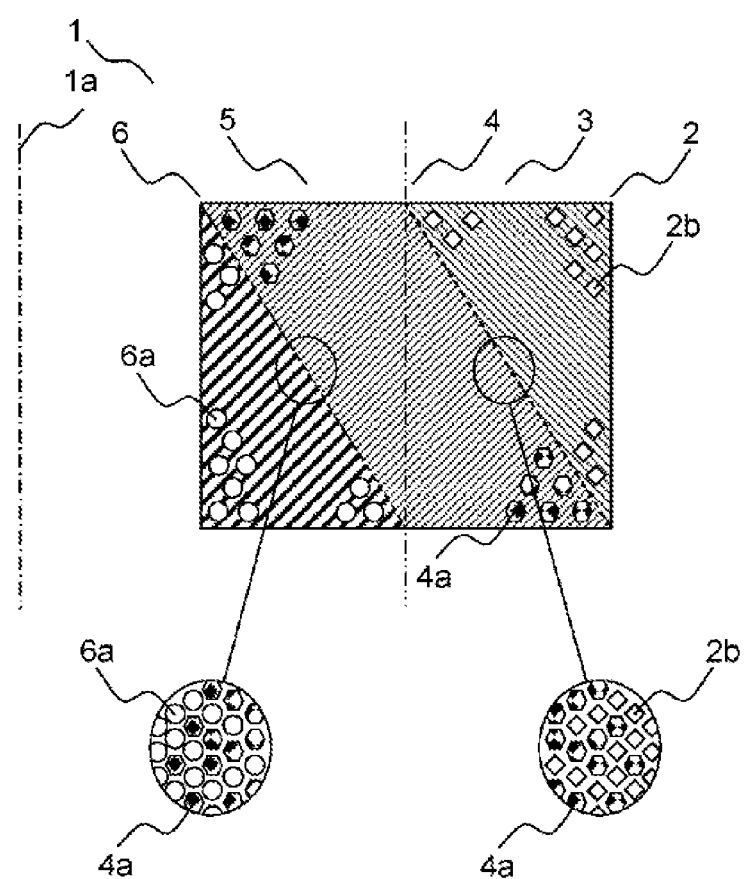
FIG. 3 is a conceptual view explaining a composition change in the commutator in the first exemplary embodiment of the present invention.
Figure 4:
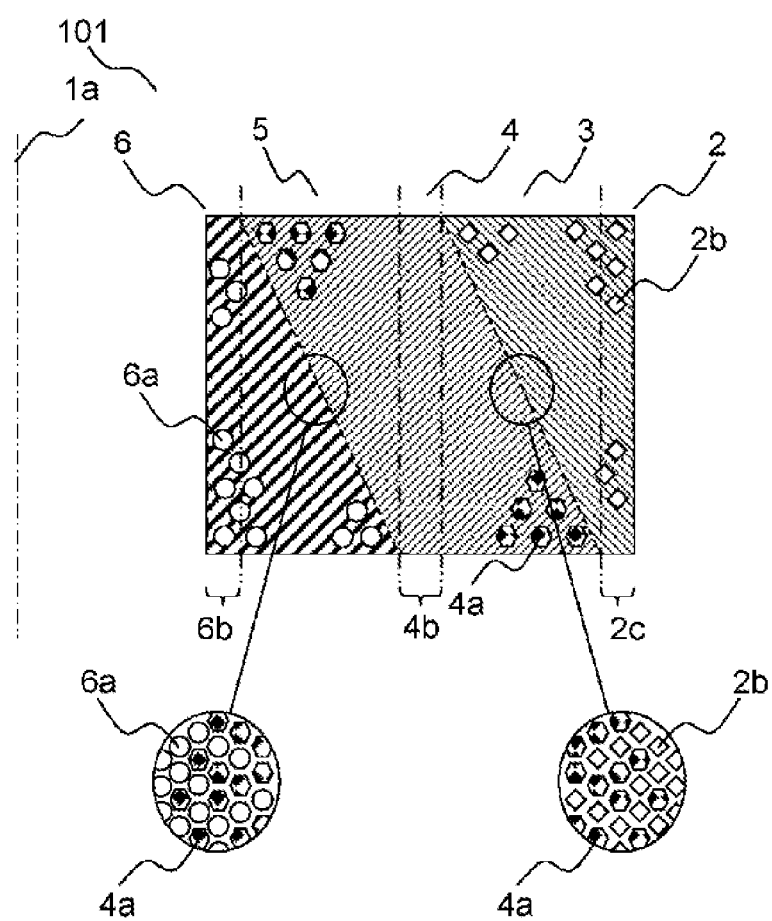
FIG. 4 is a conceptual view explaining another composition change in the commutator in the first exemplary embodiment of the present invention.
Figure 5:
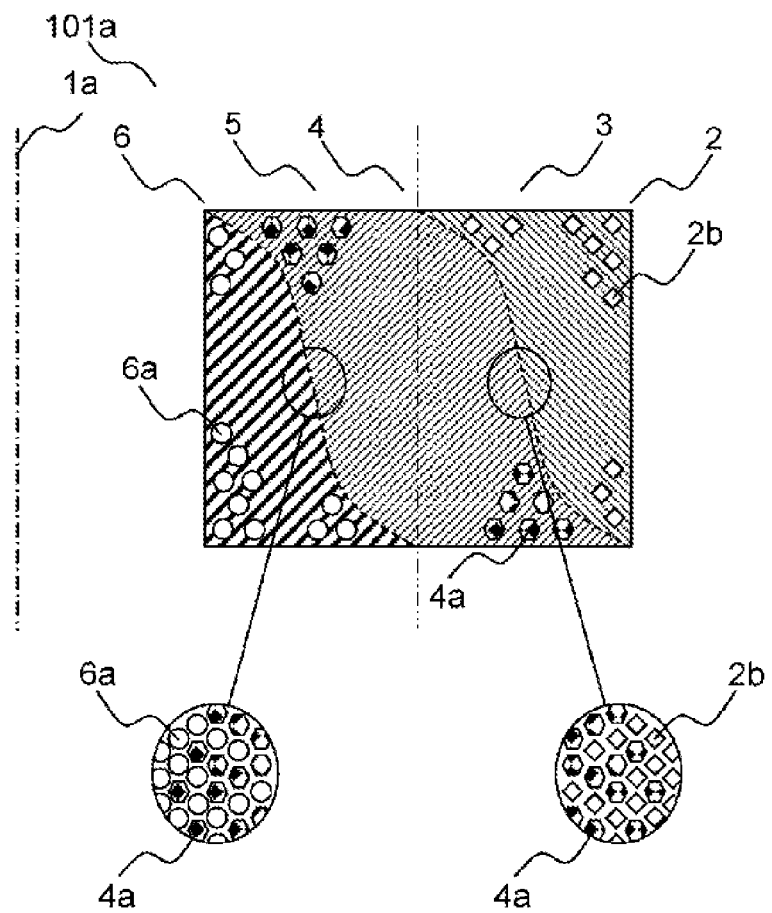
FIG. 5 is a conceptual view explaining another composition change in the commutator in the first exemplary embodiment of the present invention.

FIG. 3 is a conceptual view explaining a composition change in the commutator in the first exemplary embodiment of the present invention. FIGS. 4 and 5 are conceptual views each explaining another composition change in the commutator in the first exemplary embodiment of the present invention.

As shown in FIG. 1, commutator 1 in the first exemplary embodiment of the present invention is provided in electric motor 100. Hereinafter, electric motor 100 is, for example, a direct-current electric motor.

Electric motor 100 includes rotor 30 and stator 40.

Rotor 30 includes commutator 1, shaft 11 and rotor core 14. Commutator 1 will be described in detail later. Central axis 11a of shaft 11 is situated on axial center 1a of commutator 1. Commutator 1 is attached to shaft 11. Rotor core 14 is attached to shaft 11.

Stator 40 is situated so as to face rotor 30.

Electric motor 100 having this configuration can enjoy an effect exhibited by commutator 1, 101, 101a as described later.

As shown in FIGS. 2A and 2B, commutator 1 in the first exemplary embodiment of the present invention is formed in a cylindrical shape along axial center 1a. Commutator 1 includes electrically conductive part 2, resin part 6, ceramic part 4, first mixing part 3 and second mixing part 5.

Electrically conductive part 2 is situated on an outer periphery side in a direction orthogonal to axial center 1a. Electrically conductive part 2 contains an electrically conductive material. In electrically conductive part 2, a plurality of commutator pieces 2a are formed to extend from outer periphery surface 1b toward an opposite side of axial center 1a.

Resin part 6 is situated on an inner periphery side in a direction orthogonal to axial center 1a. Resin part 6 contains a resin material.

Ceramic part 4 is situated between electrically conductive part 2 and resin part 6 in a direction orthogonal to axial center 1a. Ceramic part 4 contains a ceramic material.

First mixing part 3 is situated between electrically conductive part 2 and ceramic part 4 in a direction orthogonal to axial center 1a. First mixing part 3 contains the electrically conductive material and the ceramic material in mixture. In first mixing part 3, a content of the electrically conductive material decreases and a content of the ceramic material increases from electrically conductive part 2 toward ceramic part 4.

Second mixing part 5 is situated between ceramic part 4 and resin part 6 in a direction orthogonal to axial center 1a. Second mixing part 5 contains the ceramic material and the resin material in mixture. In second mixing part 5, a content of the ceramic material decreases and a content of the resin material increases from ceramic part 4 toward resin part 6.

Particularly, a configuration exhibiting a remarkable effect is as follows.

First mixing part 3 includes a functionally gradient material containing the electrically conductive material and the ceramic material in mixture. Second mixing part 5 includes a functionally gradient material containing the ceramic material and the resin material in mixture.

As shown in FIG. 2B, electrically conductive part 2 further includes groove part 7, which is recessed toward axial center 1a from outer periphery surface 1b on a surface orthogonal to axial center 1a, between each pair of adjacent commutator pieces 2a among a plurality of commutator pieces 2a.

Groove part 7 is formed along axial center 1a. Groove part 7 electrically isolates a pair of adjacent commutator pieces 2a from each other.

As shown in FIG. 2C, height H1 of groove part 7 extends from outer periphery surface 1b to outer periphery surface 3a of first mixing part 3 on the surface orthogonal to axial center 1a.

Alternatively, as shown in FIG. 2D, height H2 of groove part 7 extends from outer periphery surface 1b to inner periphery surface 3b of first mixing part 3 on the surface orthogonal to axial center 1a.

In commutator 1 having a configuration as described above, a capacitance generated between a pair of adjacent commutator pieces 2a is 0.5 µF or more.

In the commutator having a configuration as described above, a capacitance generated between a pair of adjacent commutator pieces 2a is 1.0 µF or more for obtaining a higher effect.

In commutator 1 having a configuration as described above, the first mixing part that forms the groove part, or each of the first mixing part that forms the groove part and the ceramic part has a relative dielectric constant of 100 or more.

In commutator 1 having a configuration as described above, the first mixing part that forms the groove part, or each of the first mixing part that forms the groove part and the ceramic part has a relative dielectric constant of 1000 or more for obtaining a higher effect.

The first exemplary embodiment will be further described in detail with reference to drawings.

As shown in FIG. 1, field magnet 13 is attached to electric motor 100 along inner periphery surface 12a of frame 12 formed in a cylindrical shape. In electric motor 100, rotor 30 is situated on an inner periphery side of field magnet 13.

Rotor 30 includes shaft 11, armature 10 and commutator 1.

Armature 10 includes rotor core 14, insulator 15 and wire 16. In the first exemplary embodiment, rotor core 14 is formed by laminating steel plates. Rotor core 14 may have other configuration as long as an effect similar to that of laminated steel plates can be obtained. Wire 16 is wound around rotor core 14 with insulator 15 interposed between rotor core 14 and wire 16. Insulator 15 electrically insulates rotor core 14 and wire 16 from each other. Insulator 15 can be formed of resin.

Armature 10 and commutator 1 are attached to shaft 11. Shaft 11 is rotatable with central axis 11a as a rotation center.

As shown in FIG. 2A, commutator 1 includes a plurality of commutator pieces 2a. As shown in FIG. 1, commutator 1 is in contact with a pair of brushes 17 at a plurality of commutator pieces (2a) in the first exemplary embodiment 1. A pair of brushes 17 are in contact with a plurality of commutator pieces (2a) in a direction orthogonal to central axis 11a. The direction orthogonal to central axis 11a is also referred to as a radial direction. A surface at which each of a plurality of commutator pieces (2a) and each of a pair of brushes 17 rub against each other is also referred to as a rubbing surface 17a.

A pair of brushes 17 can be each provided by use of a carbon material.

A driving current is supplied from each of brushes 17 through rubbing surface 17a to each of a plurality of commutator pieces (2a). A direction in which the driving current is fed changes according to a positional relationship at the time when commutator pieces (2a) are in contact with brushes 17. The direction in which the driving current is fed changes, so that armature 10 is rotated. Change of the direction in which the driving current is fed is also referred to as commutation.

As shown in FIGS. 2A and 2B, commutator 1 in the first exemplary embodiment of the present invention has a cylindrical shape. In the direction crossing axial center 1a, commutator 1 includes electrically conductive part 2 situated on an outer periphery side, resin part 6 situated on an inner periphery side, and ceramic part 4 situated between electrically conductive part 2 and resin part 6.

Electrically conductive part 2 is formed of an electrically conductive material. As the electrically conductive material, copper, a copper alloy or the like can be used. In electrically conductive part 2, commutator pieces 2a are formed to extend toward an opposite side of axial center 1a.

Resin part 6 is formed of a resin material having electrically insulating property. As the resin material, a thermosetting resin such as epoxy resin or phenol resin can be used.

Ceramic part 4 is formed of a ceramic material. As a ceramic material having dielectric property, an inorganic ceramic component to which a various kinds of elements are added in a very small amount can be used. Examples of the inorganic ceramic component include silicon dioxide ($SiO_2$), aluminum oxide ($Al_2O_3$), magnesium oxide (MgO) and boron nitride (BN). As the ceramic material, barium titanate can also be used.

Each of the above-mentioned constitutional elements may contain a small amount of unintended impurities.

Commutator 1 includes first mixing part 3 between electrically conductive part 2 and ceramic part 4. First mixing part 3 has a composition in which an electrically conductive material and a ceramic material are mixed with each other.

Commutator 1 includes second mixing part 5 between ceramic part 4 and resin part 6. Second mixing part 5 has a composition in which a ceramic material and a resin material are mixed with each other.

For example, commutator 1 shown in the first exemplary embodiment can be provided while having a configuration as described below.

In FIG. 3, a right side corresponds to an outer periphery side of commutator 1 and a left side corresponds to an inner periphery side of commutator 1. In commutator 1, a composition constituting a major proportion continuously changes from electrically conductive material 2b to ceramic material 4a to resin material 6a from the outer periphery side toward the inner periphery side as shown in FIG. 3. More specifically, the major composition of commutator 1 changes from electrically conductive material 2b through a mixture of electrically conductive material 2b and ceramic material 4a to ceramic material 4a. Further, the major composition of commutator 1 changes from ceramic material 4a through a mixture of ceramic material 4a and resin material 6a to resin material 6a. This change gradually occurs while electrically conductive material 2b and ceramic material 4a are mixed together, and ceramic material 4a and resin material 6a are mixed together as shown in an enlarged form in FIG. 3.

That is, first mixing part 3 as a mixture of electrically conductive material 2b and ceramic material 4a functions as a functionally gradient material. Similarly, second mixing part 5 as a mixture of ceramic material 4a and resin material 6a functions as a functionally gradient material.

Therefore, in commutator 1, a boundary surface is not formed between the materials, and the composition of each of the materials continuously changes. Accordingly, commutator 1 has no microscopic voids which are supposed to be generated at a definite boundary surface if the boundary surface is formed.

In this configuration, commutator 1 including a plurality of materials is capable of distributing thermal stress as if it were a single body composed of one material. Accordingly, even if a centrifugal force acts on commutator 1 in rotation of rotor (30) at a high speed, delamination and cracking do not occur in commutator pieces 2a etc. Therefore, commutator 1 has improved reliability.

Commutator 1 can be prepared using a discharge plasma sintering method as shown in a second exemplary embodiment as described later.

The composition change in the commutator 1 in the first exemplary embodiment can occur in a manner as described below.

As shown in FIG. 4, commutator 101 has a region composed of a single material. Specifically, commutator 101 includes region 2c composed of electrically conductive material 2b, region 4b composed of ceramic material 4a, and region 6b composed of resin material 6a, in this order from the outer periphery side toward to inner periphery side of commutator 101.

Regions 2c, 4b and 6b are each intended to be composed of a single material wherever possible. Regions 2c, 4b and 6b do not exclude coexistence of other unintended materials.

As shown in FIG. 5, a content of electrically conductive material 2b and ceramic material 4a in commutator 101a does not linearly change in first mixing part 3. Similarly, a content of ceramic material 4a and resin material 6a in commutator 101a does not linearly change in second mixing part 5.

In this configuration, a desired capacitance etc. can be obtained according to required specifications in commutators 101, 101a.

As shown in FIGS. 2B to 2D, commutator 1 includes groove part 7, which is recessed toward axial center 1a from outer periphery surface 1b on the surface orthogonal to axial center 1a, between each pair of adjacent commutator pieces 2a. Groove part 7 is formed along axial center 1a. Groove part 7 electrically isolates a pair of adjacent commutator pieces 2a from each other.

As shown in FIG. 2B, a depth of groove part 7 can be adjusted within a range from outer periphery surface 1b of commutator 1 to ceramic part 4.

Particularly, a shape allowing a remarkable effect to be exhibited is as follows.

That is, as shown in FIG. 2C, depth H1 of groove part 7 extends from outer periphery surface 1b of commutator 1 to outer periphery surface 3a of first mixing part 3. Alternatively, as shown in FIG. 2D, depth H2 of groove part 7 extends from outer periphery surface 1b of commutator 1 to inner periphery surface 3b of first mixing part 3.

1. Capacitor Function:

Some of ceramic materials function as a dielectric material. Hereinafter, a function of a ceramic material as a dielectric material is also referred to as a capacitor function.

In this configuration, a capacitor function produced in groove part 7 in commutator 1 can be adjusted by adjusting the depth of groove part 7.

Specifically, when the depth of groove part 7 extends from outer periphery surface 1b of commutator 1 to outer periphery surface 3a of first mixing part 3 (H1), a capacitance of groove part 7 increases.

When the depth of groove part 7 extends from outer periphery surface 1b of commutator 1 to inner periphery surface 3b of first mixing part 3 (H2), a capacitance of groove part 7 decreases. In commutator 1, a required capacitance can be obtained by adjusting the depth of groove part 7 by making use of the above-mentioned property.

Accordingly, when the commutator in the first exemplary embodiment is used, spark discharge occurring between the commutator and the brush in rotation of the rotor can be suppressed.

In the first exemplary embodiment, resistance of commutator 1 to spark is improved as a value of capacitance generated between a pair of adjacent commutator pieces 2a.

For example, when the capacitance generated between a pair of adjacent commutator pieces 2a is 0.5 µF or more, groove part 7 exhibits an effective capacitor function to a low-power electric motor. The low-power electric motor is, for example, an electric motor with an input voltage of 12 V or less. Examples of the low-power electric motor include small electric motors for use in automobiles and electric motors for use in electric tools.

When the capacitance generated between a pair of adjacent commutator pieces 2a is 1.0 µF or more, groove part 7 can exhibit a more stable capacitor function to a high-power electric motor as well. The high-power electric motor is, for example, an electric motor with an input voltage of 48 V or more. Examples of the high-power electric motor include large electric motors for use in automobiles and electric motors for use in cleaners.

In other words, when a capacitance of at least 0.5 µF is generated between a pair of adjacent commutator pieces 2a, resistance of commutator 1 to spark can be secured.

In groove part 7, the capacitance can be adjusted by adjusting a ceramic material that forms first mixing part 3, or first mixing part 3 and ceramic part 4. Specifically, when a relative dielectric constant of first mixing part 3, or first mixing part 3 and ceramic part 4 is 100 or more, groove part 7 exhibits an effective capacitor function. Particularly, when a relative dielectric constant generated between a pair of adjacent commutator pieces 2a is 1000 or more, groove part 7 can exhibit a more stable capacitor function.

In this configuration, a capacitance of 0.5 µF or more can be secured in groove part 7.

Accordingly, when the commutator in the first exemplary embodiment is used, spark discharge occurring between the commutator and the brush in rotation of the rotor can be suppressed.

Examples of the ceramic material having a relative dielectric constant of 100 or more include strontium titanate. Examples of the ceramic material having a relative dielectric constant of 1000 or more include barium titanate. Alternatively, for the ceramic material, a solid solution having a desired relative dielectric constant can be formed by mixing a material having a high dielectric constant and a material having a low dielectric constant at a predetermined ratio.

As shown in FIG. 3, a portion of the mixture of electrically conductive material 2b and ceramic material 4a, which has a content of ceramic material 4a of 20% to 60% in terms of a volume ratio, exhibits an effective capacitor function as first mixing part 3.

Here, a portion of the mixture of electrically conductive material 2b and ceramic material 4a, which has a content of ceramic material 4a of less than 20% in terms of a volume ratio, functions as electrically conductive part 2.

A portion of the mixture of electrically conductive material 2b and ceramic material 4a, which has a content of ceramic material 4a of more than 60% in terms of a volume ratio, functions as ceramic part 4.

A portion of the mixture of electrically conductive material 2b and ceramic material 4a, which has a content of ceramic material 4a of 30% to 50% in terms of a volume ratio, exhibits a more stable capacitor function as first mixing part 3.

Here, a portion of the mixture of electrically conductive material 2b and ceramic material 4a, which has a content of ceramic material 4a of less than 30% in terms of a volume ratio, functions as electrically conductive part 2.

A portion of the mixture of electrically conductive material 2b and ceramic material 4a, which has a content of ceramic material 4a of more than 50% in terms of a volume ratio, functions as ceramic part 4.

In the configuration described above, electrically conductive part 2 has an excessively high content of electrically conductive material 2b, and therefore required insulating property cannot be secured between a pair of adjacent commutator pieces (2a).

Ceramic part 4 has an excessively low content of electrically conductive material 2b, and therefore a required function of adjusting the capacitance cannot be secured between a pair of adjacent commutator pieces (2a).

It is evident from the above description that in the commutator in the first exemplary embodiment of the present invention, a value of capacitance generated between a pair of adjacent commutator pieces can be secured within a desired range.

Accordingly, when the commutator in the first exemplary embodiment 1 is used in an electric motor, spark discharge desired in an electric appliance to which the electric motor is attached can be suppressed.

2. Variable Resistor Function (Varistor Function):

Some of ceramic materials have property in which a resistance value changes depending on an applied voltage, i.e. nonlinear resistance property.

The ceramic material described below is different from the ceramic material described above in "1. Capacitor Function" in that the ceramic material described below has nonlinear resistance property.

In addition, a mode in which the ceramic material is used is as described in "1. Capacitor Function".

The ceramic material having nonlinear resistance property functions as an element that absorbs a surge. Some of ceramic materials having nonlinear resistance property contain a very small amount of additives with zinc oxide as a main raw material. As the additives, bismuth, praseodymium, cobalt, manganese, chromium, antimony and the like can be used. In addition, examples of the ceramic material having nonlinear resistance property include barium titanate.

Examples of the element that absorbs a surge include varistors. A capacity of the varistor is shown in terms of a varistor voltage.

In commutator 1, the varistor voltage generated in groove part 7 can be adjusted by, for example, adjusting the depth of groove part 7.

Specifically, when the depth of groove part 7 extends from outer periphery surface 1b of commutator 1 to outer periphery surface 3a of first mixing part 3 (H1), the varistor voltage of groove part 7 increases.

When the depth of groove part 7 extends from outer periphery surface 1b of commutator 1 to inner periphery surface 3b of first mixing part 3 (H2), the varistor voltage of groove part 7 decreases. In commutator 1, a required varistor voltage can be obtained by adjusting the depth of groove part 7 by making use of the above-mentioned property.

Thus, when the commutator in the first exemplary embodiment is used, spark discharge occurring between the commutator and the brush in rotation of the rotor can be suppressed.

It is evident from the above description that in the commutator in the first exemplary embodiment of the present invention, desired performance can be secured by selecting materials that form the commutator. Particularly, the first mixing part, or each of the first mixing part and the ceramic part functions as a capacitor or a varistor according to a ceramic material employed.

That is, when a material that functions as a dielectric material is used as the ceramic material in the first exemplary embodiment, the first mixing part, or each of the first mixing part and the ceramic part functions as a capacitor.

When a material having nonlinear resistance property is used as the ceramic material in the first exemplary embodiment, the first mixing part, or each of the first mixing part and the ceramic part functions as a varistor.

(Second Exemplary Embodiment)

Figure 6:
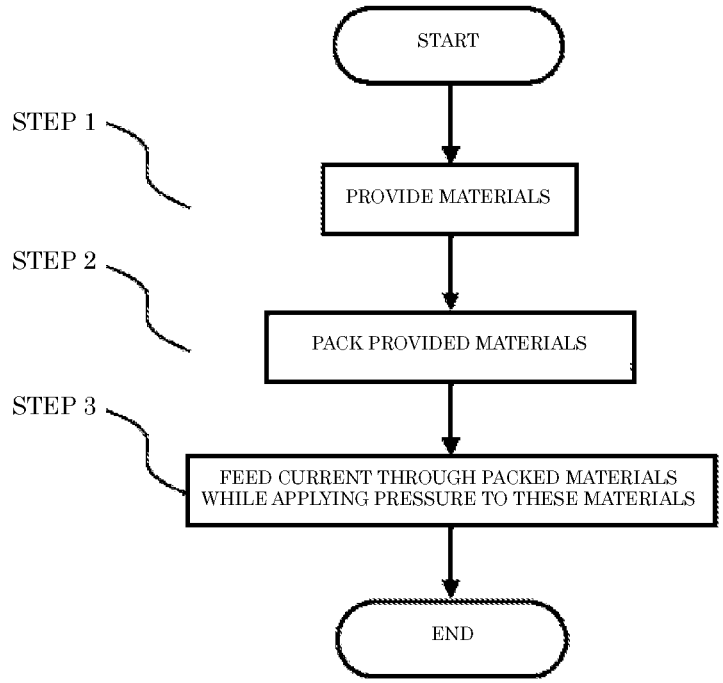
FIG. 6 is a flow chart showing a method for manufacturing a composition in a second exemplary embodiment of the present invention.
Figure 7A:
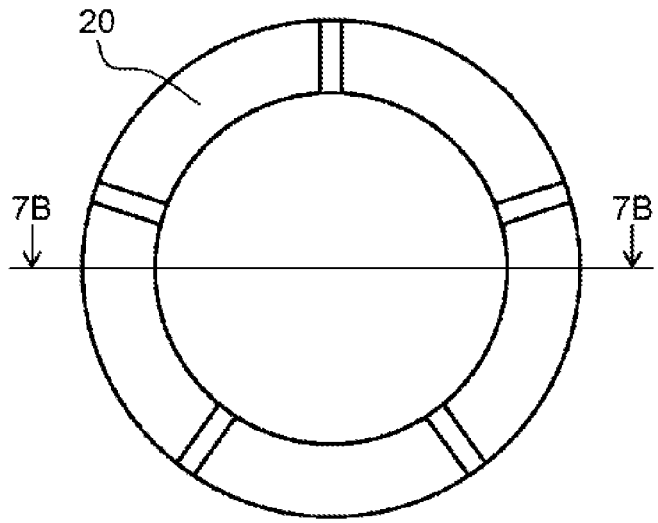
FIG. 7A is a plan view of a varistor to be attached to a conventional commutator.
Figure 7B:
FIG. 7B is a sectional view showing a cross-section taken along line 7B-7B shown in FIG. 7A.
Figure 8A:
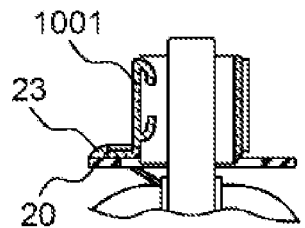
FIG. 8A is a main part conceptual view showing a mounting state of a conventional commutator.
Figure 8B:
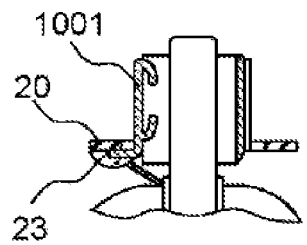
FIG. 8B is a main part conceptual view showing another mounting state of a conventional commutator.
Figure 8C:
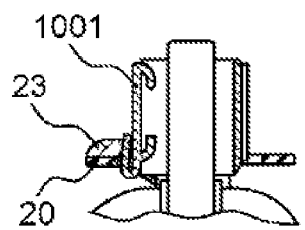
FIG. 8C is a main part conceptual view showing another mounting state of a conventional commutator.
Figure 8D:
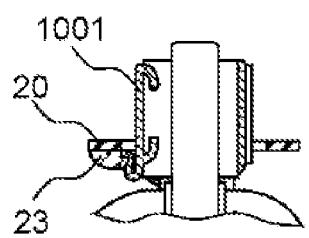
FIG. 8D is a main part conceptual view showing another mounting state of a conventional commutator.
Figure 9A:
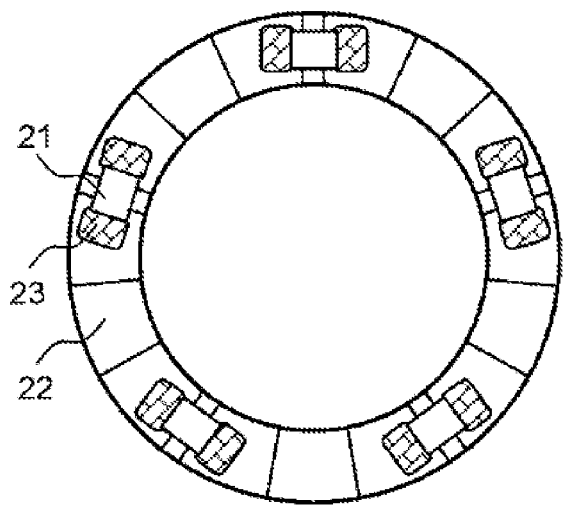
FIG. 9A is a plan view showing a mounting state of a capacitor to be attached to a conventional commutator.
Figure 9B:
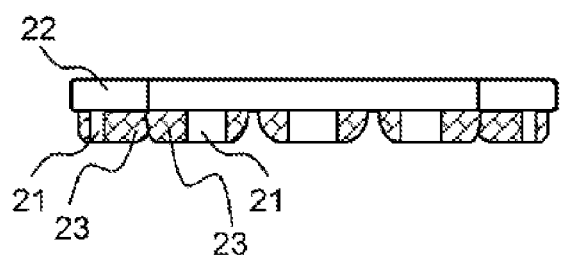
FIG. 9B is a side view showing a mounting state of a capacitor to be attached to a conventional commutator.
Figure 10A:
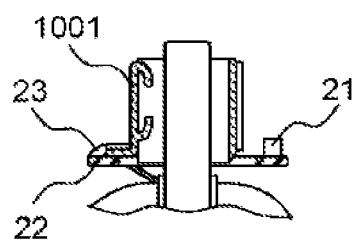
FIG. 10A is a main part conceptual view showing a mounting state of a conventional commutator.
Figure 10B:
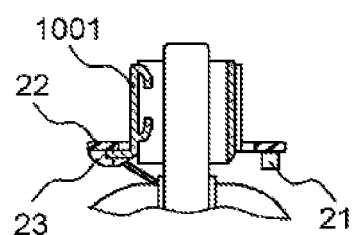
FIG. 10B is a main part conceptual view showing another mounting state of a conventional commutator.
Figure 10C:
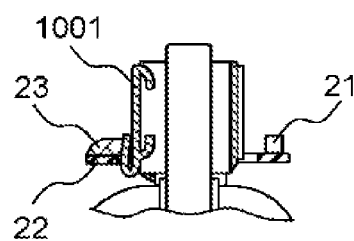
FIG. 10C is a main part conceptual view showing another mounting state of a conventional commutator.
Figure 10D:
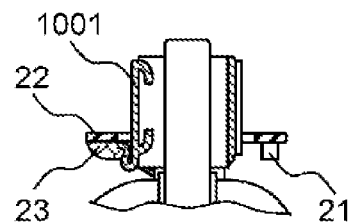
FIG. 10D is a main part conceptual view showing another mounting state of a conventional commutator.

FIG. 6 is a flow chart showing a method for manufacturing a commutator in a second exemplary embodiment of the present invention.

Configurations similar to those for the commutator in the first exemplary embodiment are given like symbols. These configurations are as described in the first exemplary embodiment.

As shown in FIG. 6, the method for manufacturing a commutator in the second exemplary embodiment of the present invention includes steps as described below.

That is, a providing step includes providing an electrically conductive material, a ceramic material and a resin material (step 1).

A packing step includes packing the electrically conductive material, the ceramic material and the resin material. The packing step includes packing the electrically conductive material and the ceramic material in mixture, and the ceramic material and the resin material in mixture (step 2).

An electric current feeding step includes feeding an electric current pulsewise through the packed electrically conductive material, the electrically conductive material and the ceramic material packed in mixture, the packed ceramic material, the ceramic material and the resin material packed in mixture, and the packed resin material while applying a pressure to these materials (step 3).

Commutator 1, 101, 101a described in the first exemplary embodiment is manufactured by passing through the above-described steps.

For the method for manufacturing a commutator as shown in the second exemplary embodiment, a discharge plasma sintering method can be used. The commutator manufactured by the manufacturing method shown in the second exemplary embodiment includes a functionally gradient material in which contents of the electrically conductive material, the ceramic material and the resin material change in order.

Accordingly, in the commutator manufactured by the manufacturing method shown in the second exemplary embodiment, a boundary surface is not formed between the materials, and the composition of each of the materials continuously changes. Therefore, the commutator has no microscopic voids which are supposed to be generated at a definite boundary surface if the boundary surface is formed.

A commutator of the present invention can also be used in a direct-current electric motor, a universal electric motor for both alternating-current and direct-current use, or the like. Particularly, since a large current is fed through the commutator of the present invention, the commutator can be expected to exhibit a high effect in an electric motor that is used in applications where a surrounding of a commutator has a high temperature.

The invention claimed is:

1. A commutator formed in a cylindrical shape along an axial center, the commutator comprising, in a direction orthogonal to the axial center:
   an electrically conductive part which is situated on an outer periphery side of the commutator, and contains an electrically conductive material and in which a plurality of commutator pieces are formed to extend from an outer periphery surface of the commutator toward an opposite side of the axial center;
   a resin part which is situated on an inner periphery side of the commutator, and contains a resin material;
   a ceramic part which is situated between the electrically conductive part and the resin part, and contains a ceramic material;
   a first mixing part which is situated between the electrically conductive part and the ceramic part, and contains the electrically conductive material and the ceramic material in mixture and in which a content of the electrically conductive material decreases and a content of the ceramic material increases from the electrically conductive part toward the ceramic part; and
   a second mixing part which is situated between the ceramic part and the resin part, and contains the ceramic material and the resin material in mixture and in which a content of the ceramic material decreases and a content of the resin material increases from the ceramic part toward the resin part.

2. The commutator according to claim 1, wherein
   the first mixing part includes a functionally gradient material containing the electrically conductive material and the ceramic material in mixture, and
   the second mixing part includes a functionally gradient material containing the ceramic material and the resin material in mixture.

3. The commutator according to claim 1, wherein the electrically conductive part further includes a groove part which is recessed toward the axial center from the outer periphery surface on a surface orthogonal to the axial center, between each pair of adjacent commutator pieces among the plurality of commutator pieces.

4. The commutator according to claim 3, wherein the groove part is formed along the axial center, and electrically isolates a pair of the adjacent commutator pieces.

5. The commutator according to claim 3, wherein a depth of the groove part extends from the outer periphery surface to an outer periphery surface of the first mixing part on the surface orthogonal to the axial center.

6. The commutator according to claim 3, wherein a depth of the groove part extends from the outer periphery surface to an inner periphery surface of the first mixing part on the surface orthogonal to the axial center.

7. The commutator according to claim 3, wherein a capacitance generated between a pair of the adjacent commutator pieces is 0.5 µF or more.

8. The commutator according to claim 3, wherein a capacitance generated between a pair of the adjacent commutator pieces is 1.0 µF or more.

9. The commutator according to claim 3, wherein the first mixing part that forms the groove part, or each of the first mixing part that forms the groove part and the ceramic part has a relative dielectric constant of 100 or more.

10. The commutator according to claim 3, wherein the first mixing part that forms the groove part, or each of the first mixing part that forms the groove part and the ceramic part has a relative dielectric constant of 1000 or more.

11. An electric motor which comprises:
a rotor including:
the commutator according to claim 3;
a shaft which has a central axis situated on the axial center and to which the commutator is attached; and
a rotor core attached to the shaft; and
a stator situated so as to face the rotor.

12. A method for manufacturing the commutator according to claim 3, the method comprising:
providing the electrically conductive material, the ceramic material and the resin material;
separately packing the electrically conductive material, the ceramic material and the resin material, and separately packing the electrically conductive material and the ceramic material in mixture, and the ceramic material and the resin material in mixture; and
feeding an electric current pulsewise through the packed electrically conductive material, the electrically conductive material and the ceramic material packed in mixture, the packed ceramic material, the ceramic material and the resin material packed in mixture, and the packed resin material while applying a pressure to these materials.

* * * * *